(12) United States Patent
Minto et al.

(10) Patent No.: US 11,619,145 B2
(45) Date of Patent: Apr. 4, 2023

(54) COORDINATED COMBINED CYCLE POWER PLANT RESPONSE FOR BLOCK LOADING IN GRID RESTORATION

(71) Applicant: General Electric Company, Schenectady, NY (US)

(72) Inventors: Karl Dean Minto, Fountain Inn, SC (US); John Rogers Huey, Greenville, SC (US); Quentin Lorron, Belfort (FR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/313,406

(22) Filed: May 6, 2021

(65) Prior Publication Data

US 2022/0356820 A1 Nov. 10, 2022

(51) Int. Cl.
| | |
|---|---|
| F01K 23/10 | (2006.01) |
| F01D 19/00 | (2006.01) |
| F01K 13/02 | (2006.01) |
| F01K 23/16 | (2006.01) |
| F02C 6/18 | (2006.01) |

(52) U.S. Cl.
CPC ............ *F01K 23/101* (2013.01); *F01D 19/00* (2013.01); *F01K 13/02* (2013.01); *F01K 23/16* (2013.01); *F02C 6/18* (2013.01)

(58) Field of Classification Search
CPC ........ F01K 23/101; F01K 13/02; F01K 23/16; F01D 19/00; F02C 6/18
See application file for complete search history.

(56) References Cited

U.S. PATENT DOCUMENTS

| | | | | |
|---|---|---|---|---|
| 4,103,178 | A * | 7/1978 | Yannone | H02H 7/06 290/40 R |
| 5,794,431 | A * | 8/1998 | Utamura | F02C 7/10 60/39.182 |
| 6,952,926 | B2 * | 10/2005 | Blatter | F01K 23/101 60/39.182 |
| 7,621,133 | B2 | 11/2009 | Tomlinson et al. | |

(Continued)

OTHER PUBLICATIONS

Extended European Search Report and Opinion issued in connection with corresponding EP Application No. 22170380.4 dated Oct. 6, 2022, 9 pages.

*Primary Examiner* — Jesse S Bogue
(74) *Attorney, Agent, or Firm* — James Pemrick; Charlotte Wilson; Hoffman Warnick LLC (57) ABSTRACT

A method for block loading an electrical grid with a combined cycle power plant (CCPP) includes operating a gas turbine system of the CCPP in an islanding mode with a steam turbine system of the CCPP off line with turning gear rotating only; loading the steam turbine system accordingly to temperature matching conditions of the steam turbine system, the loading of the steam turbine system includes controlling gas turbine exhaust fed to the steam turbine system and the gas turbine exhaust temperature heats the steam turbine system and to meet temperature matching conditions of the steam turbine system; wherein controlling gas turbine exhaust includes controlling fuel flow and air flow to the gas turbine system; and operating at least one of the gas turbine system and steam turbine system to block load the electrical grid from a load on at least one of gas turbine system and steam turbine system.

15 Claims, 4 Drawing Sheets

(56) References Cited

U.S. PATENT DOCUMENTS

| | | | |
|---|---|---|---|
| 7,966,102 B2* | 6/2011 | Kirchhof | H02J 3/24 |
| | | | 700/286 |
| 9,523,313 B2 | 12/2016 | Kim et al. | |
| 2009/0112374 A1* | 4/2009 | Kirchhof | H02J 3/46 |
| | | | 700/287 |
| 2013/0145772 A1* | 6/2013 | Schlesier | F02C 6/18 |
| | | | 60/775 |
| 2014/0260284 A1 | 9/2014 | Kihyung et al. | |
| 2018/0340473 A1 | 11/2018 | Prashant | |
| 2022/0069587 A1* | 3/2022 | Ledesma | H02J 3/381 |
| 2022/0195896 A1* | 6/2022 | Fujimura | F01D 25/10 |

* cited by examiner

COORDINATED COMBINED CYCLE POWER PLANT RESPONSE FOR BLOCK LOADING IN GRID RESTORATION

BACKGROUND

The subject matter disclosed herein relates to combined cycle power plants, and more specifically, a system, controls, and methodology for loading an electrical grid from a combined cycle power plant.

Combined cycle power plants combine gas turbine systems with steam turbine systems to produce electricity while reducing energy waste. In operation, gas turbine systems combust a fuel-air mixture to create torque that drives a load, such as an electrical generator. In order to reduce energy waste, combined cycle power plants use thermal energy in gas turbine system exhaust gases to create steam. Steam travels through a steam turbine system and can create power that drives a load, such as, but not limited to an electrical generator. Electrical grids may receive power from a variety of sources, increasing the number of times a combined cycle power plant must adjust its power output to the grid depending upon demand.

BRIEF DESCRIPTION

All aspects, examples and features mentioned below can be combined in any technically possible way.

An aspect of the disclosure provides a method of block loading an electrical grid with a combined cycle power plant. The method comprises operating a gas turbine system of the combined cycle power plant in an islanding mode with a steam turbine system of the combined cycle power plant off line with turning gear rotating only; loading the steam turbine system accordingly to temperature matching conditions of the steam turbine system, the loading of the steam turbine system includes as controlling gas turbine exhaust fed to the steam turbine system and the gas turbine exhaust temperature heats the steam turbine system and to meet temperature matching conditions of the steam turbine system; wherein controlling gas turbine exhaust includes controlling fuel flow and air flow to the gas turbine system; and operating at least one of the gas turbine system and steam turbine system to block load the electrical grid from a load on at least one of gas turbine system and steam turbine system.

Another aspect of the disclosure includes any of the preceding aspects, and, wherein only the gas turbine system of the combined cycle power plant provides electricity to the electrical grid when the gas turbine system is in the islanding mode.

Another further aspect of the disclosure includes any of the preceding aspects, and, wherein both the gas turbine system and steam turbine system provide electricity to the electrical grid when the temperature matching conditions of the steam turbine system are met.

A further aspect of the disclosure includes any of the preceding aspects, and wherein controlling gas turbine exhaust temperature includes controlling fuel flow to the gas turbine system.

A still further aspect of the disclosure includes any of the preceding aspects, and, wherein controlling gas turbine exhaust temperature includes controlling airflow to the gas turbine system.

Yet another aspect of the disclosure includes any of the preceding aspects, and, wherein the steam turbine system includes a heat recovery steam generator, the method further includes flowing gas turbine exhaust gas to the heat recovery steam generator of the steam turbine system, and further controlling the temperature of the gas turbine exhaust provided to the heat recovery steam generator for temperature matching conditions of the controlling fuel flow to the gas turbine system.

Another aspect of the disclosure includes any of the preceding aspects, and wherein the block loading of the electrical grid by following variable loading paths, the variable loading paths dependent on at least one of: control of fuel flow to the gas turbine system; control of air flow to the gas turbine system; and temperature matching of gas turbine exhaust with temperature matching conditions of the steam turbine system.

An aspect of the disclosure includes any of the preceding aspects, and wherein the steam turbine system includes a heat recovery steam generator, the method further includes flowing gas turbine exhaust gas to the heat recovery steam generator of the steam turbine system, and further controlling the temperature of the gas turbine exhaust provided to the heat recovery steam generator for temperature matching conditions of the controlling fuel flow to the gas turbine system.

Another further aspect of the disclosure includes any of the preceding aspects, and wherein the steam turbine system can block load the electrical grid after temperature matching conditions between the gas turbine exhaust temperature and the steam turbine system temperature matching conditions have met a threshold correspondence value.

Another still further aspect of the disclosure includes any of the preceding aspects, and wherein operating the gas turbine system in the islanding mode further includes warming up steam turbine system components; the method further including operating the gas turbine system at an intermediate load condition until a steam turbine of the steam turbine system begins accelerating to full speed.

Another aspect of the disclosure includes any of the preceding aspects, and, wherein loading of steam turbine system continues until a steam turbine of the steam turbine system enters inlet pressure control and temperature matching conditions of steam turbine system are met by gas turbine exhaust gas.

Still another aspect of the disclosure includes any of the preceding aspects, and, wherein once temperature matching conditions are met, loading of the gas turbine system and the steam turbine system continue concurrently until the block loading is complete and subsequent loading of the electrical grid can continue from loads connected to the gas turbine system and the steam turbine system.

Another additional aspect of the disclosure includes any of the preceding aspects, and, wherein loading of the electrical grid by the gas turbine system is controlled to ensure that the steam turbine system loading does not result in the gas turbine system unloading to the electrical grid to an extent to compromise support for auxiliary loads of the combined cycle power plant.

An aspect of the disclosure provides a controller for block loading an electrical grid with a combined cycle power plant, the control enabling the combined cycle power plant to flexibly operate and load a gas turbine system of the combined cycle power plant, the controller enabling operating a gas turbine system of the combined cycle power plant in an islanding mode with a steam turbine system of the combined cycle power plant off line with turning gear rotating only; loading the steam turbine system accordingly to temperature matching conditions of the steam turbine system, the loading of the steam turbine system includes as controlling gas turbine exhaust fed to the steam turbine system and the gas turbine exhaust temperature heats the steam turbine system and to meet temperature matching conditions of the steam turbine system; wherein controlling gas turbine exhaust includes controlling fuel flow and air flow to the gas turbine system; and operating at least one of the gas turbine system and steam turbine system to block load the electrical grid from a load on at least one of gas turbine system and steam turbine system.

Another aspect of the disclosure includes any of the preceding aspects, and, wherein the controller further manages only the gas turbine system of the combined cycle power plant to provide electricity to the electrical grid when the gas turbine system is in the islanding mode.

Another further aspect of the disclosure includes any of the preceding aspects, and, wherein both the gas turbine system and steam turbine system provide electricity to the electrical grid when the temperature matching conditions of the steam turbine system are met.

Yet another aspect of the disclosure includes any of the preceding aspects, and wherein the controller further manages gas turbine exhaust temperature by controlling fuel flow to the gas turbine system.

Another additional aspect of the disclosure includes any of the preceding aspects, and, wherein the controller further manages gas turbine exhaust temperature by controlling airflow to the gas turbine system.

Another aspect of the disclosure includes any of the preceding aspects, and, wherein the steam turbine system includes a heat recovery steam generator, the controller further directs flowing gas turbine exhaust gas to the heat recovery steam generator of the steam turbine system, and further controls the temperature of the gas turbine exhaust provided to the heat recovery steam generator for temperature matching conditions of the controlling fuel flow to the gas turbine system.

An aspect of the disclosure includes any of the preceding aspects, and, wherein the controller responds to block loading of the electrical grid by following variable loading paths, the variable loading paths dependent on at least one of: control of fuel flow to the gas turbine system; control of air flow to the gas turbine system; and temperature matching of gas turbine exhaust with temperature matching conditions of the steam turbine system.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology it will become necessary to select certain terminology when referring to and describing relevant machine components within a combined cycle power plant to load an electrical power grid. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

As embodied by the disclosure, "block loading" means providing electricity to blocks with a load of various sizes during network restoration. Network restoration can occur after a grid failure, such as but not limited to, a black out. For example, one block in a grid to be restored may include any number of units, such as 1 to about 100 "units" (for example, but not limiting of the embodiments, where a "unit" is a house, separate feed to meters, and the like). Subsequent blocks may include more or less units than the "one" block, for example, 5 units, 75 units, 250 units, 500 units, 1000 units, or any number of units. The number of units and blocks discussed herein is merely exemplary of the disclosure and not intended to limit the embodiments in any manner.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The embodiments of the disclosure include controls, systems, and methods for coordinating actions of a gas turbine and steam turbine, arranged in a combined cycle power plant, when responding to block loads that arise in the restoration of a blacked-out electrical grid. An aspect of the embodiments provides a combined cycle power plant to restore a blacked-out electrical grid without addition of new hardware. In other words, the combined cycle power plant merely has a control system or software-only upgrade.

Accordingly, aspects of the embodiments also enable the gas turbine and steam turbine to restore a blacked-out electrical grid, thus providing for increased combined cycle power plant output and shortened electrical grid restoration times.

Another aspect of the disclosure enables coordination of gas turbine and steam turbine responses in a combined cycle power plant (CCPP) to block load electrical grids during restoration after a black-out event. Operational controls of a gas turbine and a steam turbine in a combined cycle power plant can regulate fuel and airflow in the combined cycle power plant. As embodied by the disclosure, fuel flow to the gas turbine is controlled to maintain gas turbine speed at 100% of gas turbine rated speed for enhanced electrical grid loading. Thus, gas turbine fuel flow in the combined cycle power plant can maintain electrical grid frequency. As blocks of electrical load are added to the grid, a generator's speed may droop momentarily. This drooping occurs because the mechanical power output of gas turbine system 14 cannot respond as fast as the electrical demand on the load or generator 42. A resulting torque imbalance on gas turbine system 14 and shaft 40 results in a slowing or "drooping". Drooping may continue during block loading until mechanical output increases to balance the electrical demand. In this instance, frequency response of the combined cycle power plant 10 can be seen as two distinct portions. One portion can be defined as an initial, fast-acting portion, which is due to normal droop in loading, followed by a second slower acting portion, which is due to a "pseudo-isochronous" control loop. Gas turbine fuel flow will be adjusted by the control schema and processes as embodied by the disclosure, to restore the combined cycle power plant's gas turbine speed and its output to reload the electrical grid.

Concurrently, and in coordination with fuel flow to the gas turbine, gas turbine airflow is regulated and controlled to maintain a stable and substantially constant gas turbine exhaust temperature. A constant gas turbine exhaust temperature provides constant steam operational conditions for steam turbine of the combined cycle power plant. Independent control of gas turbine fuel and airflow, as embodied by the disclosure, permits gas turbine operation to absorb blocks of added load to the electrical grid, while maintaining essentially constant grid frequency and grid loading for electrical grid restoration. Independent control of gas turbine fuel and airflow, as embodied by the disclosure, also supports start-up of the combined cycle power plant steam turbine and the steam turbine feeding power to the combined cycle power plant generator, and ultimately restoring the electrical grid.

Grid block loading after a black out is intended to restore the electrical grid as quickly as possible. Grid restoration should enable blocks of various sized electrical load to be fed to the grid during network restoration. For example, as discussed above, one block in a grid to be restored may include any number of units, such as 1-100 "units" (for example, but not limiting of the embodiments, houses, separate feeds to meters, and the like), while subsequent blocks may include 250 units, 500 units, 1000 units or more, or any number of units, more or less than the first block. In some instances, there may be limits on the size of the block; however, the embodiments herein are envisioned utilizable on blocks of varying sizes. The number of units discussed herein is merely exemplary of the disclosure and not intended to limit the embodiments in any manner. Of course, timeliness and promptness of restoration is an important factor in restoring power to the grid. Combined cycle power plants are well suited to grid restoration, as they exhibit rapid response and flexibility of operation, especially operation of the gas turbines, as long as loading of a gas turbine from the blackout does not adversely impact the steam turbine's operations.

Thus, as embodied by the disclosure, control of and managing a combined cycle power plant gas turbine enables it to provide a significant percentage of electrical grid loading, such as after a black out. The control of and managing a combined cycle power plant gas turbine also provides conditions for subsequent inclusion of steam turbine block loading of the electrical grid, which may not be feasible in some combined cycle power plant methodology and controls.

In the past where steam turbines have been relied upon as the primary block loading features in a combined cycle power plant, steam turbine and steam systems generally require significant physical modifications. Physical modifications may include changes to steam turbine control schema and processes as well as steam system hardware, including, but not limited to, steam turbine piping and control valves. Also, steam turbine modifications may result in slower response and steam production from a heat recovery steam generator (HRSG) in block loading.

Accordingly, aspects of the embodiments provide mechanisms, controls, and methodologies for a combined cycle power plant to enable electrical restoration to a blacked out electrical grid. Also, aspects of the embodiments provide mechanisms, controls, and methodologies for a combined cycle power plant to transition from electrical grid restoration of a blacked out electrical grid to normal operation.

Some combined cycle power plants, as noted above, may not enable restoration of a blacked out electrical grid, as its gas turbine cannot operate independently of its steam turbine. In those combined cycle power plants, gas turbine controls are tightly coordinated with a gas turbine's fuel flow and airflow in the combined cycle power plant. This tight coordination may produce a single predetermined loading path. A single loading path may not provide adequate block loading from a combined cycle power plant, especially block loading of a combined cycle power plant after a black out occurrence.

Thus, a flexible loading path, as embodied by the disclosure, is provided with a combined cycle power plant gas turbine, especially block loading of a combined cycle power plant after a black out occurrence. The flexible loading path sets forth a variable load path (VLP), such as in OpFlex® gas turbine controls, provided by General Electric Company of Schenectady, N.Y. OpFlex or variable load path in gas turbine controls provide a variable loading path and flexibility with a relaxation of tightly coordinated gas turbine fuel flow and airflow, which may be found in some existing gas turbine control schemas.

As embodied by the disclosure, gas turbine controls with a flexible loading path and variable loading path incorporate a control schema that supports gas turbine operation with independent control and regulation of fuel flow and airflow. A further aspect of the embodiments provides fuel flow to the gas turbine being coordinated with or proportional to at least one of gas turbine speed and grid frequency. Additionally, as embodied by the disclosure, airflow to the gas turbine is coordinated with or proportional to steam turbine operation(s).

Accordingly, the embodiments provide a reference or target value of gas turbine exhaust temperatures based on steam turbine operational conditions. Thus, the gas turbine exhaust temperatures based on steam turbine operational conditions aligns and coordinating those combined cycle power plant operational aspects. Moreover, as embodied by the disclosure, adjustment of gas turbine exhaust temperatures in a combined cycle power plant are in proportion to a steam turbine's operational state conditions, such as the steam turbine operational condition being "warm," "hot" or "cold" for start.

The controls, systems, and methods, as embodied by the disclosure, enable shorter startup times for the combined cycle power plant, especially from black out conditions to load the electrical grid. In other words, controls, systems, and methods enable increasing operation of a gas turbine and a steam turbine in a combined cycle power plant from a no-load scenario, such as after a black out or first load state, to a base load or a second load state to provide desired loading to the electrical grid. The controls, systems, and methods herein enable expedited combined cycle power plant startup times through increased steam production by variable loading of gas turbine. Moreover, a further aspect of the embodiments provides systems and methods for enabling control of gas turbine exhaust gas temperature and gas turbine loading to enhance steam production in a heat recovery steam generator (HRSG) of the combined cycle power plant. Thus, the HRSG of combined cycle power plant can produce steam of a sufficient temperature and pressure for the steam turbine of the combined cycle power plant to contribute to loading the electrical grid in a block load scenario. A block load scenario is operable to accelerate steam turbine startup for combined cycle power plant block loading the electrical grid.

Figure 1:
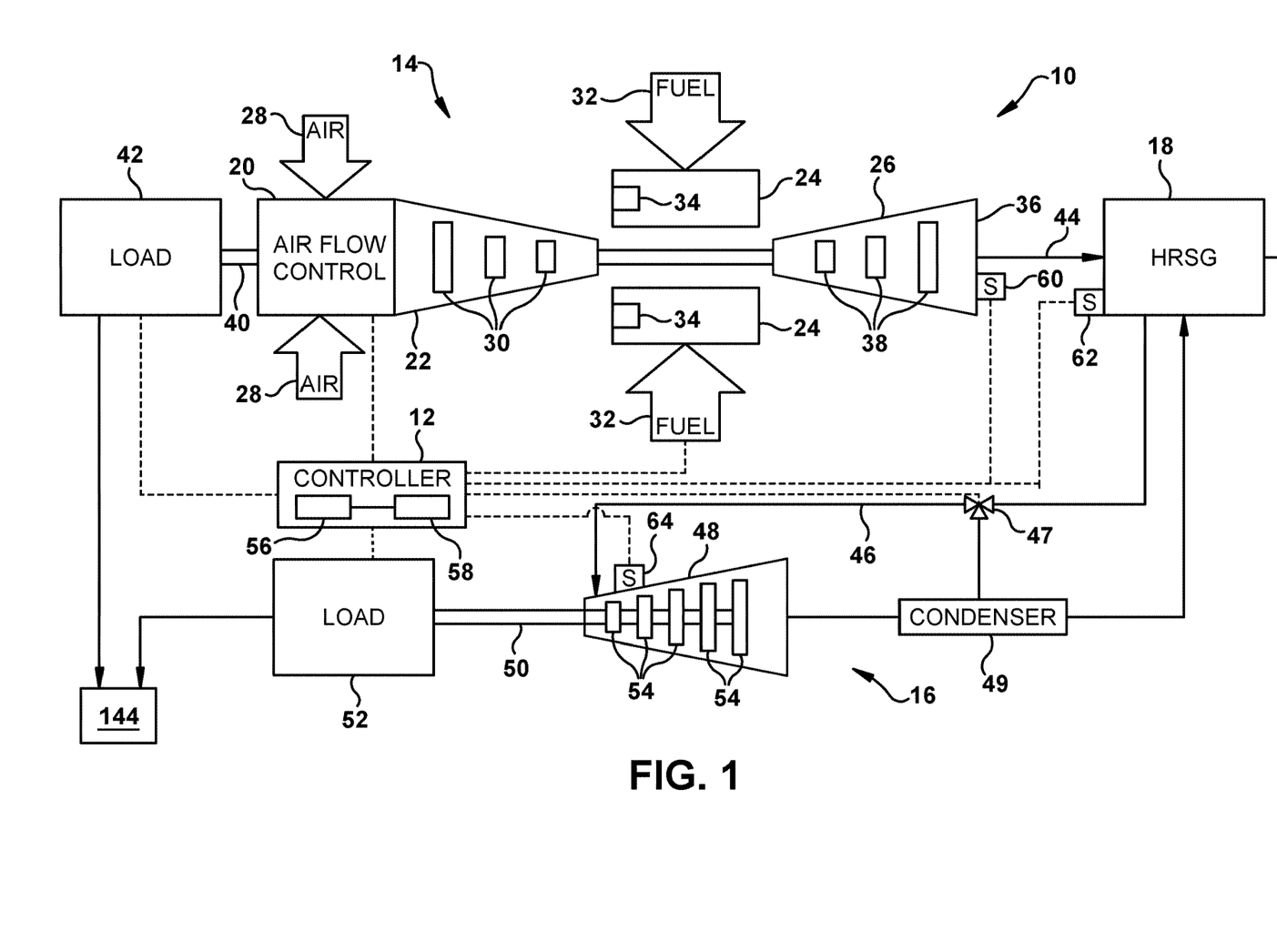
FIG. 1 is a schematic illustration of an embodiment of a combined cycle power plant with a controller that enables loading along different load paths, according to embodiments of the disclosure.

FIG. 1 is a block diagram of an embodiment of a combined cycle power plant 10 with a controller 12 that enables loading along different load paths. As embodied by the disclosure, controller 12 enables combined cycle power plant 10 to rapidly increase electrical output (i.e., loading) from an inactive state (i.e., no electrical output) to an active state (i.e., electrical output requested for an electrical grid). In other words, controller 12 enables combined cycle power plant 10 to initiate steps to load to an electrical grid. More specifically, controller 12 enables combined cycle power plant 10 to increase power output from a gas turbine system 14 and a steam turbine system 16 of combined cycle power plant 10 through increased and accelerated steam production.

Combined cycle power plant 10 includes controller 12, gas turbine system 14, steam turbine system 16, and a heat recovery steam generator (HRSG) 18. In operation, gas turbine system 14 combusts a fuel-air mixture to create mechanical power that drives a load 42 and/or 52 (as discussed hereinafter), for example and not limited to, an electrical generator. In order to reduce energy waste, combined cycle power plant 10 uses thermal energy in gas turbine system 14 exhaust gases to heat a fluid and create steam in HRSG 18. Steam travels from HRSG 18 through steam turbine system 16 creating torque that can also be applied to drive a load 42. While not illustrated, generation of steam in HRSG 18 and subsequent development of torque in steam turbine system 16 can be provided in a single shaft combined cycle power plant 10 with a single shaft, where torque could be applied from both the gas turbine and steam turbine independently. Accordingly, combined cycle power plant 10 can combine gas turbine system 14 with steam turbine system 16 to increase power production while reducing energy waste.

Gas turbine system 14 includes an airflow control module 20, compressor 22, combustor 24, and turbine 26. In operation, an oxidant 28 (for example and not limited to, air, oxygen, oxygen enriched air, or oxygen reduced air) enters gas turbine system 14 through airflow control module 20, which controls the amount of oxidant flow (hereinafter "airflow") to gas turbine system 14. Airflow control module 20 may control airflow by heating oxidant flow, cooling oxidant flow, extracting airflow from compressor 22, using an inlet restriction, using an inlet guide vane (IGV), or a combination thereof. For simplicity of discussion, embodiments of the disclosure will refer to IGVs as a device to control airflow to gas turbine system 14. As the airflow passes through airflow control module 20, air enters compressor 22. Compressor 22 pressurizes air 28 in a series of compressor stages or rotor disks 30 with compressor blades. As compressed air exits compressor 22, airflow enters combustor 24 and mixes with fuel 32.

Gas turbine system 14 may use liquid or gas fuel, such as natural gas and/or a hydrogen rich synthetic gas, to operate gas turbine system 14. For example, fuel nozzles 34 may inject a fuel-air mixture into combustor 24 in a suitable ratio for enhanced combustion, emissions, fuel consumption, and power output. As depicted, a plurality of fuel nozzles 34 intakes fuel 32 from fuel flow, mixes fuel 32 with air, and distributes an air-fuel mixture into combustor 24. Air-fuel mixture combusts in a combustion chamber within combustor 24, thereby creating hot pressurized exhaust gases. Combustor 24 can direct exhaust gases through gas turbine 26 toward an exhaust outlet 36. As exhaust gases flow and pass through gas turbine 26, gases contact turbine blades attached to turbine rotor disks 38 or turbine stages. As exhaust gases travel through gas turbine 26, exhaust gas flow may force turbine blades to rotate rotor disks 38. Rotation of rotor disks 38 induces rotation of shaft 40 and rotor disks 30 in compressor 22. A load 42 (such as but not limited to an electrical generator) is directly connected to shaft 40 and uses rotational energy of shaft 40 to generate electricity for use by electrical grid 144. Grid 144 is indicative of any electrical infrastructure for carrying energy from combined cycle power plant 10 to its customers, e.g., electrical substations, distribution lines, etc.

As explained above, combined cycle power plant 10 harvests energy from hot exhaust gases exiting gas turbine system 14 for use by steam turbine system 16. As embodied by the disclosure, combined cycle power plant 10 channels hot exhaust gas 44 from gas turbine system 14 into heat recovery steam generator (HRSG) 18. In HRSG 18, thermal energy in combustion exhaust gases converts water into hot pressurized steam 46. HRSG 18 then enables released steam in line 46 for use in steam turbine system 16.

Steam turbine system 16 includes a steam turbine 48, shaft 50, and load 52 (such as but not limited to an electrical generator). As hot pressurized steam in line 46 enters steam turbine 48, steam contacts turbine blades attached to turbine rotor disks 54, such as but not limited to turbine stages. As steam passes through turbine stages in steam turbine 48, steam induces turbine blades to rotate rotor disks 54.

The rotation of rotor disks 54 rotates shaft 50. As illustrated, load 52, for example an electrical generator, connects to shaft 50. Accordingly, as shaft 50 rotates, load 52 uses rotational energy to generate electricity for electrical grid 144. As pressurized steam in line 46 passes through steam turbine 48, steam loses energy, in other words steam expands and cools. After exiting steam turbine 48, steam enters a condenser 49 before being routed back to HRSG 18 as feedwater, wherein it may be converted back into steam reuse in steam turbine system 16.

As explained above, controller 12 enables combined cycle power plant 10 to rapidly increase output, also known as loading, from an inactive state or no load to an active state where power is generated and provided to electrical grid 144. The active state is where a specified load is provided and load is delivered. In other words, controller 12 enables the combined cycle power plant to flexibly operate and load gas turbine system 14. Flexible loading of gas turbine system 14 may enable increased steam production in HRSG 18, and accordingly enable a relatively rapid start of steam turbine system 16. An ability to rapidly start combined cycle power plant 10 and increase the combined loading or electrical output from gas turbine system 14 and steam turbine system 16 increases the efficiency of combined cycle power plant 10. Of course, increased efficiency of combined cycle power plant 10 may result in saving time and money.

Combined cycle power plant 10 itself may include more than one gas turbine system 14 and steam turbine system 16, and only one gas turbine system 14 and steam turbine system 16 are shown in FIG. 1 solely for the sake of illustration. Compressor 22 may include a set of inlet guide vanes (IGVs) in airflow control module 20. IGVs (not illustrated for ease of understanding) are a type of adjustable compressor inlet vanes that are structured specifically to direct the incoming flow of operating fluid onto the rotating blades of compressor 20. IGVs may be adjustable between several positions to affect the flow rate, incident angle, and/or other properties of fluid entering compressor 20. IGVs thus may be capable of affecting the temperature of compressor 20, the power output and exhaust gas temperature from gas turbine system 14, and/or other properties.

Controller 12 includes a memory 56 and a processor 58. Memory 56 stores instructions and steps, such as instructions and steps written in software code. Processor 58 executes the stored instructions in response to feedback from combined cycle power plant 10. More specifically, as embodied by the disclosure, controller 12 controls and communicates with various components in combined cycle power plant 10 to flexibly control loading of gas turbine system 14. Control of loading gas turbine system 14 thereby enables controlled loading of steam turbine system 16. As illustrated, controller 12 controls airflow control module 20, intake and flow of fuel 32. Also, controller 12 communicates with load 42, exhaust gas temperature sensor 60, HRSG steam temperature sensor 62, and steam turbine metal temperature sensor 64, to load combined cycle power plant 10 along different loading paths.

As will be appreciated by one skilled in the art, the present disclosure may be embodied as a system, method or computer program product. Accordingly, the controller 12, as embodied by the disclosure, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized in or as controller 12. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. Memory and/or storage system can comprise any combination of various types of non-transitory computer readable storage medium including magnetic media, optical media, random access memory (RAM), read only memory (ROM), etc. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of controller 12, as embodied by the disclosure, may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In operation, controller 12 manages airflow control module 20 and consumption of fuel 32 to change loading of gas turbine system 14. Control of airflow control module 20 and consumption of fuel 32 thusly controls loading of gas turbine system 14. In turn, control of airflow control module 20 and consumption of fuel 32 thereby controls loading of combined cycle power plant 10. In other words, as embodied by the disclosure, control of airflow control module 20 and consumption of fuel 32 controls and can change loading of gas turbine system 14 thereby controlling how combined cycle power plant 10 provides electrical power output to electrical grid 144.

In a further aspect of the embodiments, controller 12 adjusts mass flow rate and temperature of gas turbine exhaust gas 44, which controls how rapidly HRSG 18 produces steam for steam turbine system 16. Adjusting mass flow rate and temperature of exhaust gas 44 controls how quickly combined cycle power plant 10 can produce electrical power using loads 42 and 52. For example, but not intending to limit the embodiments in any manner, when controller 12 increases airflow with airflow control module 20, an increased amount of airflow can flow through compressor 22, flow through combustor 24, and flow through gas turbine 26. Accordingly, an increase in airflow correspondingly increases mass flow rate of exhaust gas, and thus torque on shaft 40.

Moreover, an increase in mass flow rate of exhaust gas 44 increases the amount of thermal energy available for HRSG 18 to produce steam, or by enabling more exhaust gas 44 to be able to flow to and through HRSG 18. An increase in HRSG 18 steam production can expedite startup time for steam turbine system 16. Thus, increase in HRSG 18 steam production can start steam turbine system 16 faster and accordingly reduce time for electrical output from load 52 to grid 144.

As noted above, controller 12 controls fuel flow and consumption by gas turbine system 14. Control of fuel 32 flow affects mass flow rate through gas turbine system 14 and thermal energy available for HRSG 18. Therefore, as embodied by the disclosure, when controller 12 increases gas turbine fuel consumption, temperature of exhaust gas 44 increases. The increase in exhaust gas 44 temperature enables HRSG 18 to correspondingly produce steam at higher temperatures and pressures. Higher steam temperatures and pressures may increase power production by steam turbine system 16. However, when controller 12 decreases fuel consumption, a corresponding reduction in exhaust gas 44 temperature may occur. If there is a reduction in exhaust gas 44 temperature, it may lessen mechanical energy available to drive load 42. Accordingly, less thermal energy may be available to produce steam for steam turbine system 16 to drive load 52.

Controller 12 is configured to enable variable block loading operations via different loading paths of the combined cycle power plant 10 following a black out situation. Controller 12 regulates/controls loading and operation of combined cycle power plant 10 in zones for block loading, as set forth herein. Referencing FIG. 1 and FIG. 3, a first Zone (Zone 1) or part of block loading operations following a black out situation is where electricity to grid 144 is provided by gas turbine system 14 acting alone. Steam turbine system 16 is offline on turning gear only at this zone of block loading of grid 144. Gas turbine system 14 will be supporting block loading per grid 144 requirements, maintaining a frequency within predetermined range of power grid 144, as blocks of load of various sizes are added or even removed from power grid 144.

In order to ensure that the frequency remains within predetermined range of power grid 144, in Zone 1, gas turbine system 14 operates in what is known as "pseudo-isochronous" mode. This pseudo-isochronous mode is a standard control mode used when a gas turbine is operated in an islanding mode, and controls load or generator 42 to electrical grid 144, with the explicit purpose of regulating the electrical frequency of the electrical grid 144.

A characteristic of block loading following a black out situation includes an immediate increase in an electrical output to load or generator 42 of combined cycle power plant 10. However, as mechanical power output of gas turbine system 14 cannot respond as fast as electrical demand of the load or generator 42, a resulting torque imbalance on gas turbine system 14 and shaft 40 may result in slowing or "drooping" as discussed above. The drooping may continue during block loading until mechanical output increases to balance an electrical demand. Combined cycle power plant 10 frequency response can be seen as two distinct portions. One portion can be defined as an initial, fast-acting portion, which is due to normal droop in loading, followed by a slower action portion, which is due to a "pseudo-isochronous" control loop. "Pseudo-isochronous" control loop acts to ramp load speed back to a nominal value, for example if load is a generator, a nominal value of 50 Hz or 60 HZ.

In normal islanding/pseudo-isochronous operations, gas turbine system 14 inlet guide vane (IGV) controls exhaust temperature and/or firing temperature depending on gas turbine 26 loading demands. In general, control of either gas turbine 26 exhaust gas 44 temperature or firing temperature is along a traditional load path. However, in a block loading scenario of combined cycle power plant 10, in particular after a black out, gas turbine exhaust gas 44 temperatures must be controlled in accordance with steam turbine 48 temperature requirements, and in particular steam turbine 48 temperature matching requirements. This control occurs, especially but not limited to, in an initial phase of a block loading, can ensure that steam turbine system 16 can be brought online efficiently and effectively, with the exhaust gas temperature matching steam temperature requirements for the steam turbine startup.

As embodied by the disclosure, block loading in accordance to one aspect, includes independent control of gas turbine loading for speed or grid frequency control. Also, block loading of combined cycle power plant 10, as embodied by the disclosure, includes independent control of exhaust gas 44 temperature for steam cycle startup. There are two commonly used control methods for achieving such block loading independent control \ exhaust gas 44 temperature. The first is temperature matching control and the second is variable load path (VLP) control.

When the temperature matching control occurs typically at a spinning reserve of combined cycle power plant 10 with a reference or target temperature below a current temperature of exhaust gas 44. With temperature matching control, gas turbine system 14 first loads along a minimum IGV air flow position until a minimum exhaust gas 44 temperature required to enable temperature matching is reached. At this point, IGVs in air flow control 20 of gas turbine system 14 open from a minimum air flow position to reduce exhaust gas 44 temperature to a sustained exhaust temperature that matches to a reference exhaust temperature target. In a normal startup process, gas turbine 26 load remains fixed at this point until exhaust gas 44 temperature reference target is gradually increased towards an isotherm, with IGVs returning towards a minimum air flow position. When IGVs reach their minimum air flow position, gas turbine system 14 load may then increase, if necessary, to continue tracking exhaust gas 44 temperature reference temperature. During temperature matching control, gas turbine system 14 load follows a required exhaust gas 44 temperature, and thus independent load control is not feasible. Accordingly, this "standard" exhaust temperature matching control method is incompatible with block loading operations.

Therefore, variable load path (VLP) as embodied by the disclosure, is used for block loading operations of combined cycle power plant 10. VLP provides a flexible approach to independent control exhaust gas 44 temperature in block loading. VLP provides concurrent and independent control of gas turbine system 14 loading and exhaust temperature. Concurrent and independent control of gas turbine loading and exhaust temperature in VLP is achieved through independently modulating fuel flow and airflow to gas turbine system 14. The result, subject to limitations imposed by gas turbine system 14 and combined cycle power plant 10 operating boundaries, is an "operating space" not constrained to a single loading or operating "path."

VLP load paths, as embodied by the disclosure, support block loading operations, with a "load priority" mode and disabling of combined cycle power plant 10 emission's boundary. Block loading using the pseudo-isochronous control, in accordance with the embodiments, is compatible with VLP with IGVs controlling gas exhaust 44 temperature.

Figure 2:
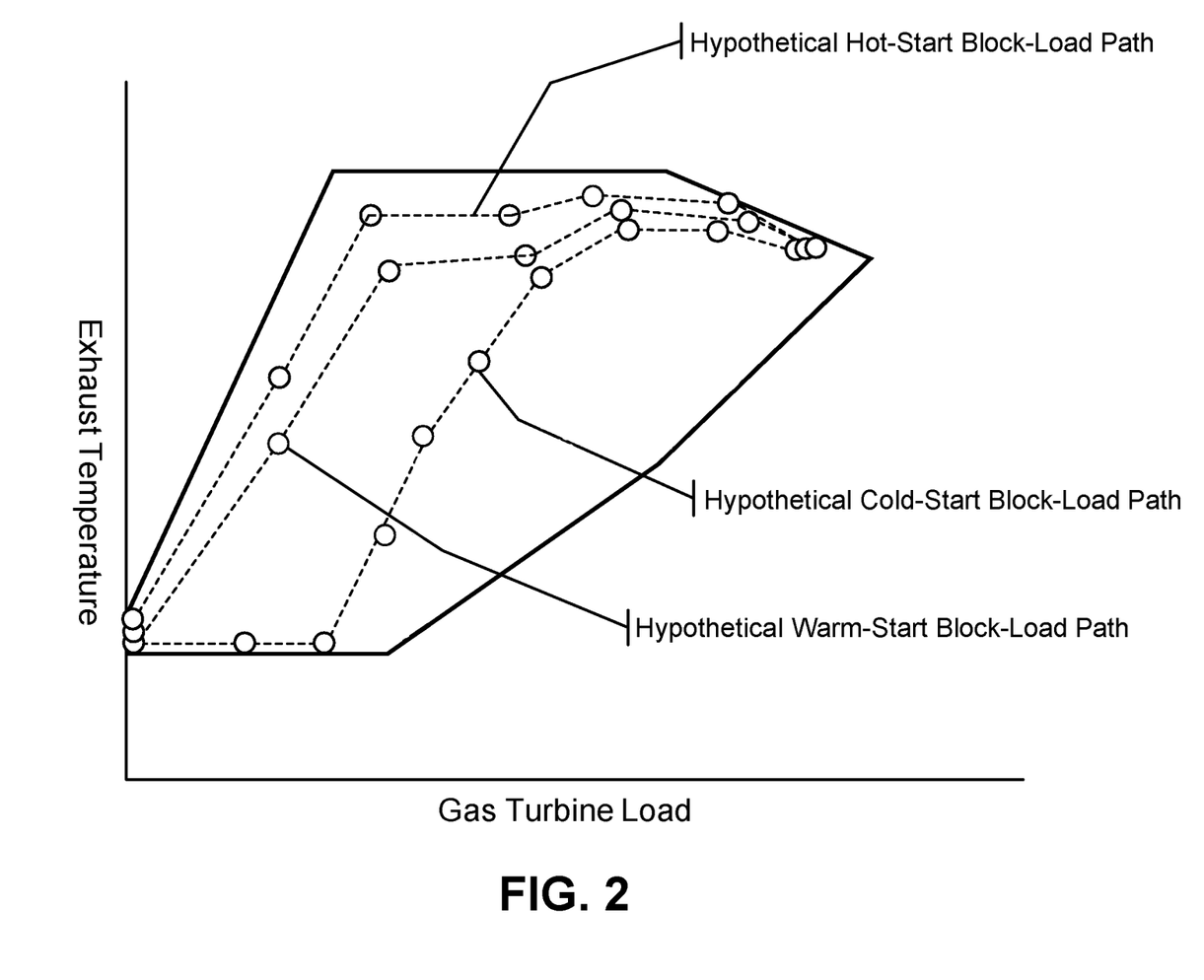
FIG. 2 is an illustrative, non-limiting, graphical representation of block loading of an electrical grid by a combined cycle power plant after a black out occurrence showing variable load paths, according to embodiments of the disclosure.

FIG. 2 illustrates possible GT block-loading paths with respect to steam turbine system operational constraints. The solid outer lines in FIG. 2 illustrate an operational boundary for variable block loading paths, as embodied by the disclosure, taking into consideration the gas turbine exhaust temperature on the vertical axis with respect to the load on the gas turbine on the horizontal axis. As gas turbine exhaust temperature is a function of fuel flow and air flow to gas turbine system, and gas turbine exhaust temperatures should be at certain steam turbine system temperature matching conditions for loading steam turbine system, and thus enabling block loading of electrical grid 144, the area in solid lines provides variable loading paths for combined cycle power plant 10 in blocking loading of electrical grid 144.

Figure 3:
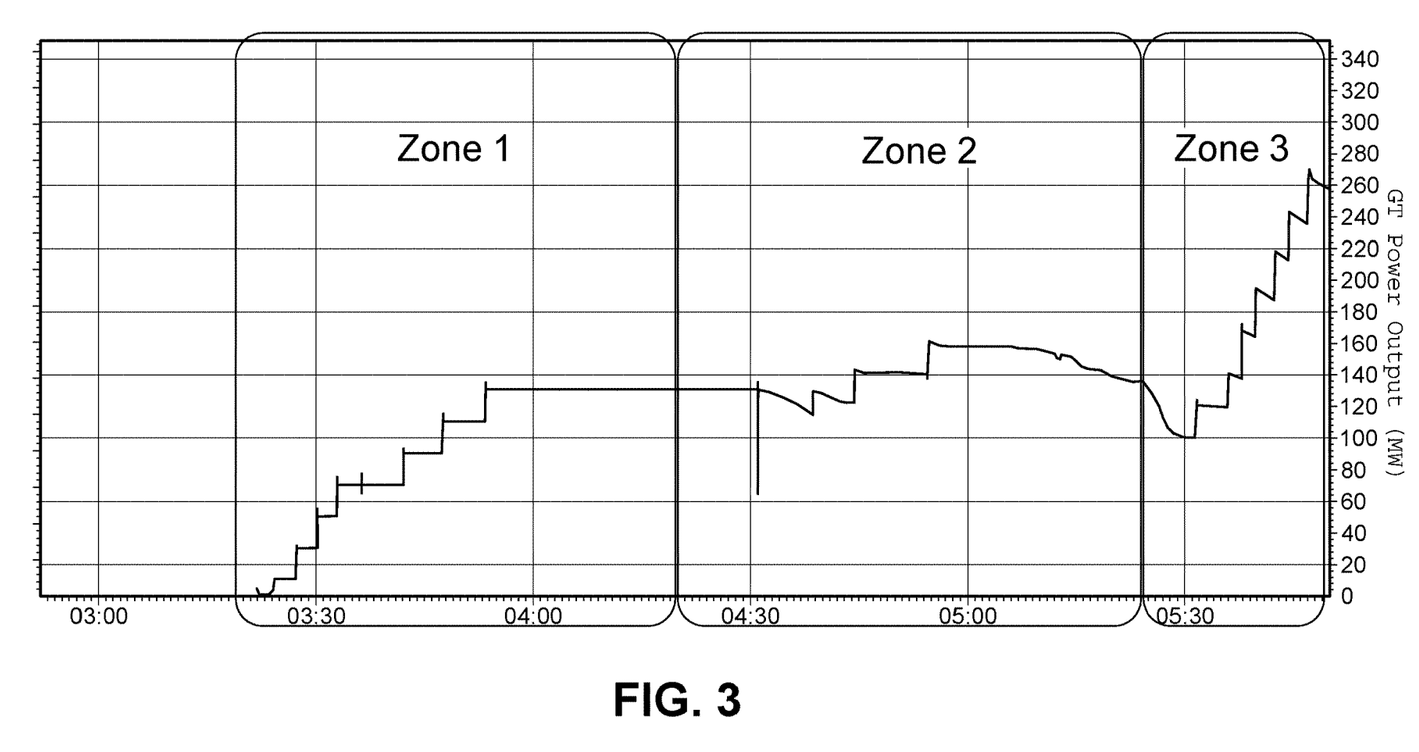
FIG. 3 is an illustrative, non-limiting, graphical representation of block loading of an electrical grid by a combined cycle power plant after a black out occurrence illustrating Zones 1, 2, and 3 according to embodiments of the disclosure.

As embodied by the disclosure, distinct regions or "zones" of operation are defined in VLP for block loading of a combined cycle power plant in providing electricity to an electrical grid 144. The zones are determined essentially by the operational state of the steam turbine during the block loading of combined cycle power plant startup. FIG. 3 illustrates a representative "warm" start block loading with 3 distinct zones, Zone 1, Zone 2, and Zone 3.

Figure 4:
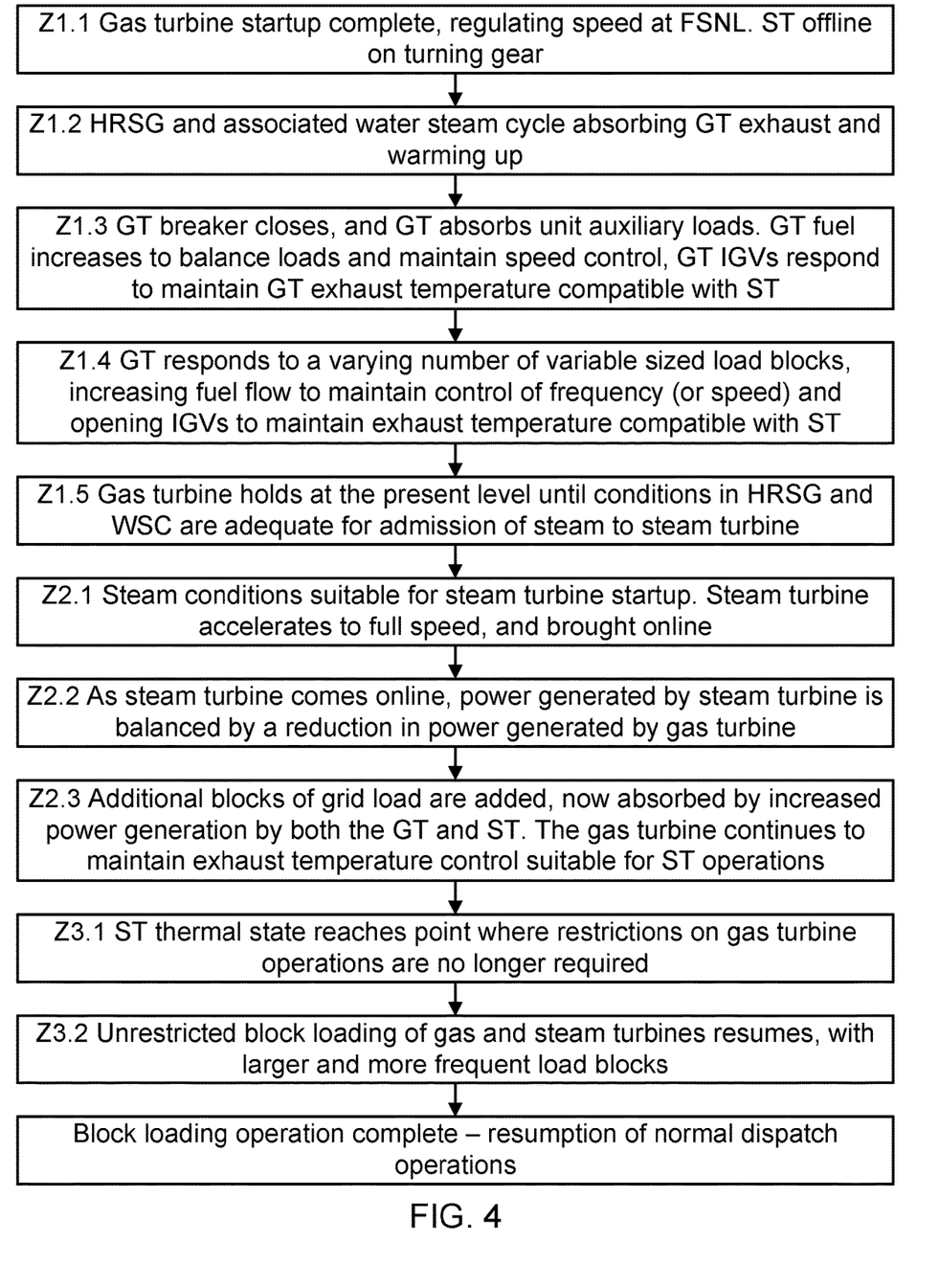
FIG. 4 is a flowchart of a block loading of an electrical grid by a combined cycle power plant after a black out occurrence.

With reference to the figures, including the flowchart of FIG. 4, at Z1.1 Zone 1 is the block loading region where only gas turbine system 14 of combined cycle power plant 10 is online startup complete, regulating speed at FSNL. The steam turbine system 16 is offline, or in other words is on turning gear alone in Zone 1. Also, in Zone 1, at Z1.2, HRSG 18 and the associated water steam cycle (WSC) are absorbing GT exhaust and warming up. Zone 1 at Z1.3, the gas turbine breaker closes, and gas turbine progresses from intermediate operation and absorbs unit auxiliary loads. Gas turbine fuel increases to balance loads and maintain speed control, and gas turbine IGVs respond to maintain gas turbine exhaust temperature compatible with steam turbine. At Z1.4, gas turbine responds to a varying number of variable sized load blocks, increasing fuel flow to maintain control of frequency (or speed) and opening IGVs to maintain exhaust temperature to be compatible with steam turbine. At Z1.5, gas turbine holds at the present level until conditions in HRSG and WSC are adequate for admission of steam to steam turbine.

Zone 2 is the block loading of combined cycle power plant 10. Steam conditions suitable for steam turbine startup. Steam turbine accelerates to full speed, and is brought online at Z2.1. As steam turbine comes online, power generated by steam turbine is balanced by a reduction in power generated by gas turbine at Z2.2. At Z2.3, additional blocks of grid load are added, now absorbed by increased power generation by both gas turbine and steam turbine. The gas turbine continues to maintain exhaust temperature control suitable for steam turbine operations.

Zone 3 is the block loading of combined cycle power plant 10 period. At Z3.1 steam turbine thermal state reaches point where restrictions on gas turbine operations are no longer required. At Z3.2, unrestricted block loading of gas and steam turbines resumes, with larger and more frequent load blocks.

According to another aspect of the disclosure, a fourth zone of the block loading VLP period is a return of combined cycle power plant 10 and gas turbine system 14 to "normal" fully loaded operation (last step in FIG. 4). Here, regulation can be provided by restored electrical grid 144. Further block loading of electrical grid 144 is provided by dispatch commands under standard droop control.

In Zone 1, gas turbine system 14 must regulate its exhaust gas 44 temperature to be compatible with temperatures needed for starting steam turbine system 16, or as noted above temperature matching conditions. In Zone 1, as embodied by the disclosure, while gas turbine system 14 is providing block loading to grid 144 and regulating its exhaust gas 44 temperature, HRSG 18 can be warming up. Steam production is building and beginning to pressurize a high pressure (HP) header (valves, seals, headers, piping, and other particulars of HRSG 18 are not illustrated for ease of understanding) in HRSG 18.

Upon detecting a flame in the gas turbine system 14, HRSG 18 can be considered "active" or "in service." In this "active" condition in Zone 1, as embodied by the disclosure, a HP bypass valve opens to allow control of developing HP header steam to pressurize reheat piping system of HRSG 18. As pressure rises in reheat piping system of HRSG 18, HRSG vent valves are opened to regulate HRSG reheat piping system pressures. This opening also enables a pressure path in HRSG 18 to ambient pressure. With a steady reheat piping steam pressure, gland steam system and steam turbine seals may be established and steam turbine system 16 condenser evacuation or "hogging" can be initiated. When the condenser pressure has been lowered to admit steam, HRSG 18 bypass valve(s) can open to regulate the reheat piping system pressure in preparation for starting steam turbine 48.

As embodied by the disclosure, as steam turbine system 16 comes online in Zone 2, output power of steam turbine system 16 will contribute to supporting block loading. Thus, gas turbine system 14 may unload to account for the load added by the steam turbine system 16 to load.

Aspects of embodiments of the disclosure, include unloading of gas turbine system 14, but controlled unloading of gas turbine system 14 to ensure that any loading of steam turbine system 16 does not result in gas turbine system 14 unloading too much so as to have gas turbine system 14 enter a reverse operation, where loading may not occur. Additionally, in Zone 2, control of gas turbine system 14 unloading to electrical grid 144, as embodied by the disclosure, can ensure that any steam turbine system 16 loading does not result in gas turbine system 14 unloading too much power to electrical grid 144 to compromise support for combined cycle power plant 10 auxiliary loads that may be needed. Consequently, as embodied by the disclosure, accepting of suitable number of block loads into gas turbine system 14 in Zone 1 can ensure that gas turbine system 14 unloading to electrical grid 144 in Zone 2 is not excessive, and is not detrimental to combined cycle power plant 10 operation.

On entry to Zone 2, gas turbine system 14 may have absorbed several blocks of load, as well as provide block loading to electrical grid 144, as embodied by the disclosure. Dependent on the thermal state of steam turbine system 16, combined cycle power plant 10 may be generating significant load for additional block loading electrical grid 144. Gas turbine system 14 is regulating combined cycle power plant 10 electricity being generated and exhaust gas 44 temperature regulates in accordance with temperature matching generated by steam turbine system 16.

Zone 3 is characterized by "unrestricted" loading, in particular for warm and hot combined cycle power plants. For a cold combined cycle power plant thermal state, however, it may be beneficial to release smaller blocks to electrical grid 144 and widely spaced in time, because steam turbine system 16 might be stress sensitive. With both gas turbine system 14 and steam turbine system 16 online in Zone 3, larger blocks of electrical load to electrical grid 144 can be provided, as the combined inertia of gas turbine system 14 and steam turbine system 16 can mitigate underspeed droop block loading of grid 144.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of block loading an electrical grid with a combined cycle power plant, the method comprising:
   operating a gas turbine system of the combined cycle power plant in an islanding mode with a steam turbine system of the combined cycle power plant off line with turning gear rotating only;
   loading the steam turbine system according to temperature matching conditions of the steam turbine system, wherein the loading of the steam turbine system includes controlling gas turbine exhaust fed to the steam turbine system and controlling a gas turbine exhaust temperature of the gas turbine system for heating the steam turbine system to meet the temperature matching conditions of the steam turbine system;

operating the gas turbine system to block load the electrical grid;

controlling fuel flow to the gas turbine system to maintain an operating speed of the gas turbine during the block loading of the electrical grid;

monitoring the temperature of the gas turbine exhaust;

controlling air flow to the gas turbine system to maintain the temperature of the gas turbine exhaust for heating the steam turbine system to meet the temperature matching conditions of the steam turbine system;

switching the combined cycle power plant from the islanding mode to an on-line mode in response to the temperature matching conditions of the steam turbine being met; and operating at least one of the gas turbine system and the steam turbine system to block load the electrical grid; wherein the steam turbine system can block load the electrical grid in conjunction with block loading of the electrical grid by the gas turbine system, the block loading of the electrical grid by the gas turbine system in the islanding mode is configured to occur after temperature matching conditions between the gas turbine exhaust temperature and the steam turbine system temperature matching conditions have met a threshold correspondence value.

2. The method according to claim 1, wherein only the gas turbine system of the combined cycle power plant is enabled to provide electricity to the electrical grid when the gas turbine system is in the islanding mode.

3. The method according to claim 1, wherein both the gas turbine system and steam turbine system provide electricity to the electrical grid when the temperature matching conditions of the steam turbine system are met.

4. The method according to claim 1, wherein the steam turbine system includes a heat recovery steam generator, the method further includes flowing gas turbine exhaust gas to the heat recovery steam generator of the steam turbine system, and further controlling the temperature of the gas turbine exhaust provided to the heat recovery steam generator to meet the temperature matching conditions of the steam turbine system.

5. The method according to claim 1, wherein the operating the at least one of the gas turbine system and the steam turbine system includes following variable loading paths for loading at least one of the gas turbine system and the steam turbine system, the variable loading paths are a response to at least one of:
control of air flow to the gas turbine system;
control of fuel flow to the gas turbine system; and
temperature matching of gas turbine exhaust with temperature matching conditions of the steam turbine system.

6. The method according to claim 5, wherein the steam turbine system includes a heat recovery steam generator, the method further includes flowing gas turbine exhaust gas to the heat recovery steam generator of the steam turbine system, and further controlling the temperature of the gas turbine exhaust provided to the heat recovery steam generator to meet the temperature matching conditions of the steam turbine system.

7. The method according to claim 1, wherein operating the gas turbine system in the islanding mode further includes warming up steam turbine system components; the method further including operating the gas turbine system at an intermediate load condition until a steam turbine of the steam turbine system begins accelerating to full speed.

8. The method according to claim 1, wherein loading of the steam turbine system continues under inlet pressure control until temperature matching conditions of the steam turbine system are met by gas turbine exhaust gas during loading of the steam turbine system.

9. The method according to claim 1, wherein once temperature matching conditions are met, loading of the gas turbine system and the steam turbine system continue until the loading is complete and block loading of the electrical grid can continue from loads connected to the gas turbine system and the steam turbine system.

10. The method according to claim 1, wherein loading of the electrical grid by the gas turbine system is controlled to ensure that the steam turbine system loading does not result in the gas turbine system unloading to the electrical grid to an extent to compromise support for auxiliary loads of the combined cycle power plant.

11. A controller for block loading an electrical grid with a combined cycle power plant, the control causing the combined cycle power plant to flexibly operate and load a gas turbine system of the combined cycle power plant, the controller enabling:

operating a gas turbine system of the combined cycle power plant in an islanding mode with a steam turbine system of the combined cycle power plant off line with turning gear rotating only;

loading the steam turbine system according to temperature matching conditions of the steam turbine system, the loading of the steam turbine system includes controlling a gas turbine exhaust fed to the steam turbine system and controlling a gas turbine exhaust temperature of the gas turbine system for heating the steam turbine system and to meet the temperature matching conditions of the steam turbine system;

operating the gas turbine system to block load the electrical grid;

controlling fuel flow to the gas turbine system to maintain an operating speed of the gas turbine during the block loading of the electrical grid;

monitoring the temperature of the gas turbine exhaust;

controlling air flow to the gas turbine system to maintain the temperature of the gas turbine exhaust for heating the steam turbine system to meet the temperature matching conditions of the steam turbine system;

switching the combined cycle power plant from the islanding mode to an on-line mode in response to the temperature matching conditions of the steam turbine being met; and operating at least one of the gas turbine system and steam turbine system to block load the electrical grid from a load on at least one of the gas turbine system and the steam turbine system; wherein the steam turbine system can block load the electrical grid in conjunction with block loading of the electrical grid by the gas turbine system, the block loading of the electrical grid by the gas turbine system in the islanding mode is configured to occur after temperature matching conditions between the gas turbine exhaust temperature and the steam turbine system temperature matching conditions have met a threshold correspondence value.

12. The controller according to claim 11, wherein the controller further manages only the gas turbine system of the combined cycle power plant to provide electricity to the electrical grid when the gas turbine system is in the islanding mode.

13. The controller according to claim 11, wherein both the gas turbine system and steam turbine system provide electricity to the electrical grid when the temperature matching conditions of the steam turbine system are met.

14. The controller according to claim 13, wherein the steam turbine system includes a heat recovery steam generator, the controller further directs flowing gas turbine exhaust gas to the heat recovery steam generator of the steam turbine system, and further controls the temperature of the gas turbine exhaust provided to the heat recovery steam generator to meet the temperature matching conditions of the steam turbine system.

15. The controller according to claim 13, wherein the controller responds to block loading of the electrical grid by following variable loading paths, the variable loading paths dependent on at least one of:
- control of air flow to the gas turbine system;
- control of fuel flow to the gas turbine system; and
- temperature matching of gas turbine exhaust with temperature matching conditions of the steam turbine system.

* * * * *